ROSCOE W. MITCHELL, JR. INVENTOR.

United States Patent Office 3,193,838
Patented July 6, 1965

3,193,838
SEISMIC SIGNAL DISPLAY SYSTEM
Roscoe W. Mitchell, Jr., Tulsa, Okla., assignor, by mesne assignments, to Esso Production Research Company, Houston, Tex., a corporation of Delaware
Filed Mar. 5, 1962, Ser. No. 177,498
7 Claims. (Cl. 346—110)

This invention concerns the display of signals having amplitude variations with respect to time. It relates especially to the display in color of information contained in a seismic signal.

Geophysical prospecting using artificially induced seismic disturbances has found wide application in the search for petroleum and other products. It is the general practice to initiate a seismic disturbance at a point near the surface of the earth to direct seismic waves downward into the earth from that point. The waves continue to travel downward within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal. The seismic signal is in effect a composite signal made up of a plurality of electrical signals varying in frequency and amplitude.

One technique that has recently been found useful in the processing of a seismic signal is the display of certain characteristics of the signal in color. A specific technique that has recently been useful in the processing of seismic data is the frequency analysis display. In this specific system a time interval between successive significant features, such as zero crossings of the seismic signal, is measured. The time interval measurement is converted to a voltage proportional to the time. The voltage is then used to deflect a mirror galvanometer. A "color wedge" is spaced between the mirror galvanometer and a recording medium. A light beam is reflected from the mirror galvanometer through the color wedge onto the recording medium. This results in a color representation on the recording medium of the particular frequency for each half cycle of the original seismic signal. While this system has proved to be quite beneficial, it is not without its difficulty. Among the problems are difficulty in aligning the galvanometers, difficulty in duplicating color filter wedges so that the results obtained from two different wedges can be duplicated. There is also a resultant heat dissipation problem resulting from the use of a lamp powerful enough to provide sufficient light for use with the color wedges. This invention overcomes or reduces all of these problems.

Briefly, the present invention broadly includes a system for presenting or displaying a signal which has amplitude variations with respect to time. The face of a cathode ray tube is provided with three distinct bands of phosphorescent material, each band being of a character to emit a separate primary color when energized by the electron beam of the cathode ray tube. Means are provided to sweep traversely the electron beam across each band sequentially. The intensity of the electron beam during each sweep is a function of the signal being processed. Optical means are provided to display the beam of light received from the cathode ray tube as a single line upon a recording medium which is moved with respect to the cathode ray tube.

A better and more complete understanding of the invention and its objects will be apparent from the following description taken in conjunction with the drawings in which.

Figure 1:
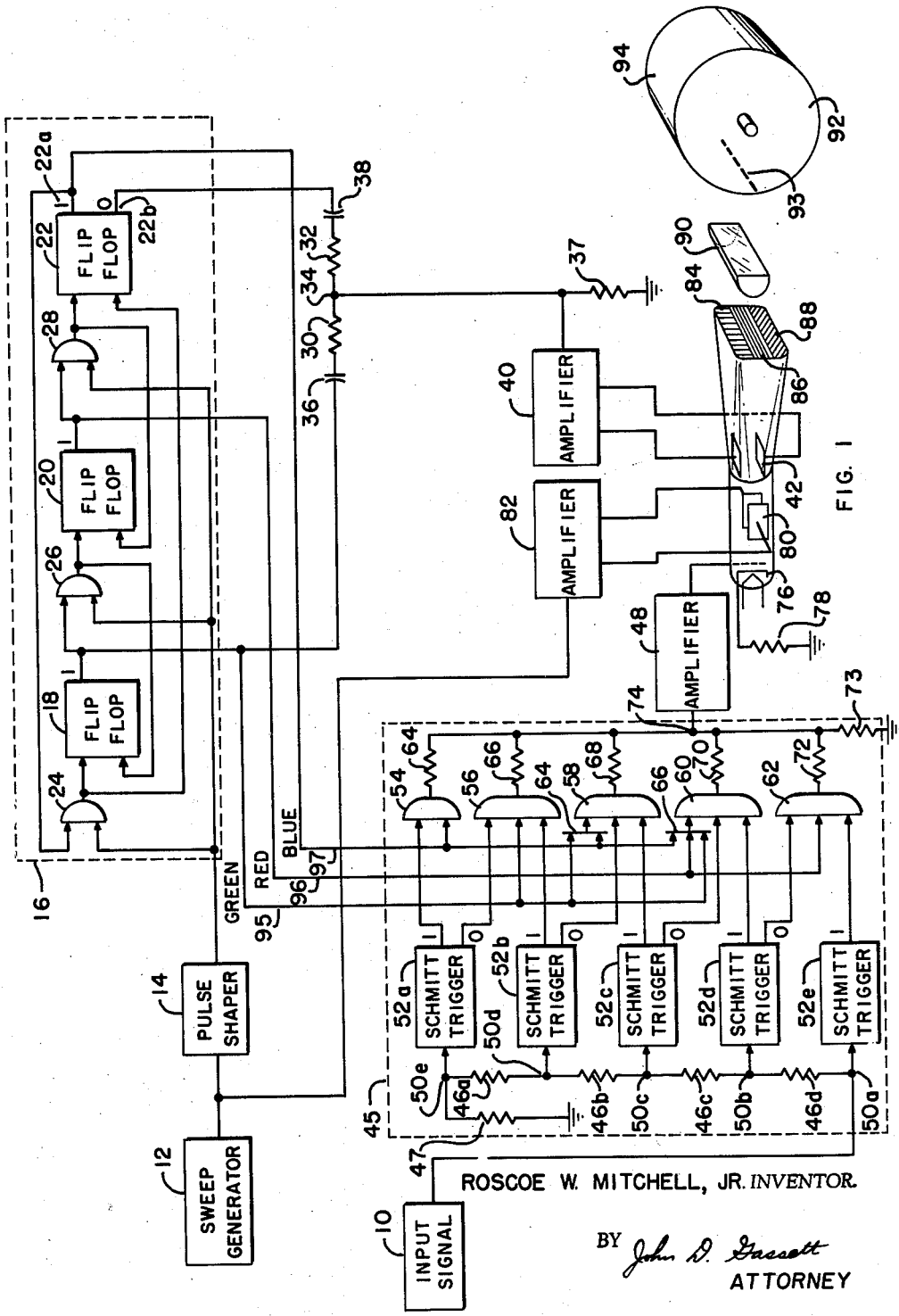
FIG. 1 illustrates, partly in schematic form and partly in circuit form, the best mode contemplated for carrying out this invention.

Illustrated on FIG. 1 is input signal source 10 and sweep generator 12. Input signal 10 can take on various forms but in general is said to have amplitude variations which vary from time to time. One such signal is schematically illustrated as curve H of FIG. 2. The amplitude of the level and its duration can, for example, represent the time between successive zero crossings of the seismic signals; that is, the distance between two successive points where the seismic signal crosses a zero reference base line. A particularly suitable means for obtaining a curve such as H is shown in U.S. patent application Serial No. 831,248 filed August 3, 1959 now Patent No. 3,063,014 in the name of John L. Shanks. It is to be understood that this invention is not limited to the waveform represented by curve H of FIG. 2, but can be used for essentially any signal having amplitude variations.

Figure 2:
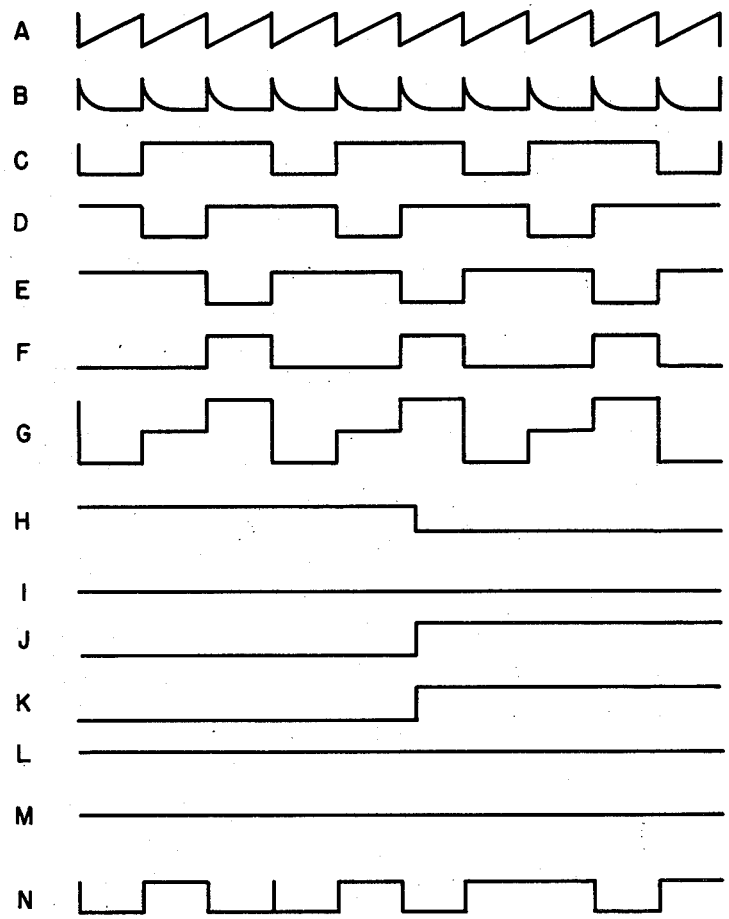
FIG. 2 illustrates the waveforms at various points of the embodiment of FIG. 1; and, FIG. 3 illustrates the face of the cathode ray tube and the path of the electron beam thereon.

A sweep generator 12 is provided and has an output such as sawtooth waveform A of FIG. 2. The frequency of the sawtooth waveform should be several times greater, i.e. at least ten or more, than the highest frequency of the input signal H. A typical value for this sawtooth frequency is 2000 cycles per second when processing a typical seismic signal. The output from sawtooth generator 12 is fed to a trigger pulse shaper 14 which develops or has an output of synchronizing trigger pulses coincident with the retrace of the sweep waveform. Such an output is illustrated as waveform B in FIG. 2. The output of trigger pulse shaper 14 is fed to a ring counter 16.

Ring counter 16 includes three bi-stable multivibrators or flip-flops 18, 20 and 22. Gate circuits 24, 26 and 28 are used in conjunction with the three flip-flops 18, 20 and 22. The gate circuits 24, 26 and 28 are illustrated as being the type commonly known as "and" gates. An output level other than zero is present if, and only if, a voltage level is present on all inputs to an "and" gate. A voltage level applied to one or more inputs, so that a pulse can pass through, are said to "enable" the gate. An "and" gate is said to be "inhibited" whenever any input is at zero level. The output of flip-flops 18, 20 and 22 are illustrated as waveforms C, D and E respectively in FIG. 2. Flip-flop 22 has output connections 22a and 22b from which waveforms E and F respectively of FIG. 2 are taken. The output F is an inverted form of output E, i.e., when a voltage exists at E, then no voltage is present at F, and when no voltage is present at E, a voltage is present at F. The output F of multivibrator 22 and the output C of multivibrator 18 are fed through blocking capacitors 36 and 38 and isolating resistors 30 and 32 to a junction point 34. The signal developed across resistor 37 and obtained at 34 is a stair-step waveform illustrated in curve G of FIG. 2. It will be observed that the stair-steps in waveform G are the sum of waveforms C and F, and are three different levels which repeat sequentially. Each change in level is coincident with the peak of the sawtooth waveform A. Waveform G is connected to amplifier 40 which drives or controls the vertical deflection plate 42 of the cathode ray tube 44.

The output from input signal source 10 is fed to a gating and matrixing circuit 45 whose output is used to control amplifier 48 which controls the strength or intensity of the electron beam of cathode ray tube 44. The output H of the signal source 10 is fed specifically into a voltage divider chain of resistors 46a through 46d and 47.

Between input signal 10 and resistor 46d is tap 50a; between resistors 46d and 46c is tap 50b; between resistors 46c and 46b is tap 50c; between resistors 46b and 46a is tap 50d; between resistors 46a and ground resistor 47 is tap 50e. The output from taps 50e, 50d, 50c, 50b, and 50a is fed respectively to Schmitt trigger circuits 52a to 52e respectively. The output from the "1" tap of Schmitt trigger circuits 52a through 52e is illustrated as waveforms I, J, K, L and M of FIG. 2. The outputs from the "0" tap of Schmitt trigger circuits 52a through 52d are the inverse of waveforms of I, J, K and L.

Also shown in the gating and matrixing circuit 45 are "and" gates 54, 56, 58, 60 and 62. Also in conjunction with these "and" gates are "or" gates 64 and 66. An "or" gate will have an output level whenever a signal is present on any or all of its inputs. Circuit means are provided connecting output E of flip-flop 22 and the output H of Schmitt trigger circuit 52a to the input of "and" gate 54. "And" gate 56 has three input taps. These input taps are connected to the output "0" tap of Schmitt trigger circuit 52a, the output of flip-flop 18 and the "1" output of Schmitt trigger circuit 52b.

"Or" gate 64 has connected to its input, the output of flip-flop 18 and the output of flip-flop 22 of the counting circuit. "And" gate 58 has connected thereto the output of "or" gate 64, the output from the "0" tap of Schmitt trigger circuit 52b and the output from the "1" tap of Schmitt trigger circuit 52c. "Or" gate 66 has connected thereto the output of each of the flip-flops 18, 20 and 22 of the ring counter 16. "And" gate 60 has connected thereto the output of "or" gate 66, the output from the "0" tap of Schmitt trigger circuit 52c and the output from the "1" tap of Schmitt trigger circuit 52d.

The output of "and" circuit 54, "and" circuit 56, "and" circuit 58, "and" circuit 60, and "and" circuit 62 are provided respectively with resistors 64, 66, 68, 70 and 72. These resistors together with ground resistor 73 provide a mixing network or matrix for combining all outputs onto one line as at junction 74. The signal from junction 74, which is represented by waveform N of FIG. 2, for example, is connected to amplifier 48. The output of amplifier 48 controls the intensity of electron beam gun 76. Gun 76 is provided with a bias resistor 78.

The sawtooth waveform from sweep generator 12 is fed to horizontal deflection amplifier 82. The output of horizontal deflection amplifier 82 is applied to the horizontal deflection plates 80 of cathode ray tube 44.

The face of cathode ray tube 44 is divided into three bands, 84, 86 and 88. Each band is coated with a material which emits light of one of the three primary colors when struck by electrons. Preferably the materials are three different phosphors. One band 84 is such as to emit red, the middle band 86 emits blue, and the lower band 88 emits green. Positioned in front, and spaced from, the face of cathode ray tube 44 is recording drum 92 upon which is mounted a color-sensitive recording medium 94. Spaced between the face of the cathode ray tube 44 and the recording medium 94 is lens 90 which is a cylindrical columnating lens capable of focusing the light from the cathode ray tube face into a single line of light on the photographic film 94. In other words, no matter which of the bands, red, blue or green, upon which the light is being emitted from the cathode ray tube, the light will pass through lens 90 and fall upon the same line on recording medium 94.

Having described the structural components of the embodiment of FIG. 1, attention will now be directed briefly toward a discussion of its operation. For convenience in this discussion a "true" signal is one which is negative relative to ground during the "on" state, and an "untrue" signal is negative relative to ground during the "off" state. This will apply especially to the flip-flops 18, 20 and 22, (comprising a ring counter 16), and to Schmitt trigger circuits 52a through 52d. The "1" output is the "true" output, and the "0" output is the "untrue" output. In the digital art this is known as "negative logic," and is widely used because of its ease of construction with semiconductor devices.

Sweep generator 12 is selected to have a relatively high frequency sawtooth waveform having fast retrace and linear sweep. Such a waveform is illustrated as waveform A in FIG. 2. The output of sweep generator 12 is amplified by amplifier 82 and is applied to the horizontal deflection plates 80 of cathode ray tube 44 to provide horizontal sweeping of the electron beam across the tube face.

The sawtooth waveform output from sweep generator 12 is also applied to trigger pulse shaper 14 which forms sharp spikes coincident with the retrace of the sweep. These spikes are illustrated in the waveform B of FIG. 2. These spikes are applied to the three "and" gates, 24, 26 and 28. Only one of the multivibrators 18, 20 and 22 can be "on" at one time. Assume that multivibrator 18 is the one that is "on"—this enables "and" gate 26 to the right of the multivibrator so that the next trigger pulse from trigger pulse shaper 14 can turn the next multivibrator 20 on. At the same time the gated pulse is fed back to the reset of the first multivibrator 18 to turn it "off." Multivibrator 22 is unaffected because its gate 28 was not enabled by an "on" signal from multivibrator 20. This same sequence of events causes each multivibrator 18, 20 and 22 in turn and in sequence to be in the "on" condition. Since multivibrator 18 is connected to multivibrator 22 in the same way that multivibrator 20 is connected to 18, and is also connected in the same manner as multivibrator 22 is connected to multivibrator 20, a ring counter circuit 16 is obtained. This particular circuit can also be called a "tri-stable switch."

Figure 3:
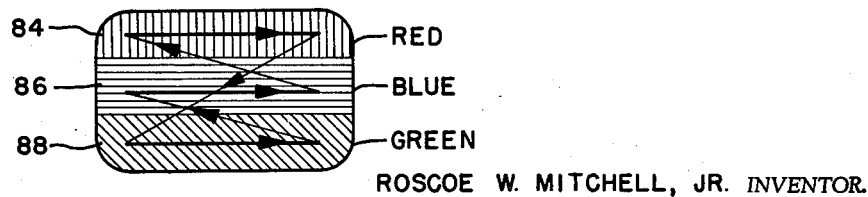

The output signal from multivibrator 18 is added to the inverted output from multivibrator 22 in resistor 37 through isolating resistors 30 and 32 and D.-C. isolating or blocking capacitors 36 and 38. This results in a repeating stair-step waveform as shown in waveform G of FIG. 2. This stair-step waveform G is amplified in amplifier 40 and the amplified signal is connected to the vertical deflection plates 42 and the cathode ray tube 44. This vertical deflection, synchronized with the horizontal deflection previously discussed, results in the beam of electrons in the cathode ray tube being swept sequentially and successively across the three different color bands in the manner illustrated in FIG. 3.

The input signal which is desired to be displayed is reproduced or otherwise obtained from input signal source 10. This signal can be any time-varying signal desired, such as a series of voltage levels in which each level is proportional to the duration of each half cycle of the original seismic signal. A portion of such a signal is illustrated in curve H of FIG. 2. The input voltage from source 10 is thus fed or applied to a voltage divider resistance 46a through 46d for obtaining different proportions of the input signal to apply to the Schmitt trigger circuits 52a through 52e. These Schmitt trigger circuits can be bi-stable circuits of conventional design which will trigger to the "on" state whenever the input exceeds some minimum value, and will trigger "off" whenever the input drops below some certain selected value. The "true" outputs of the Schmitt trigger circuits, that is from the "1" connections of the Schmitt trigger circuits 52a, 52b, 52c, 52d and 52e, are fed respectively to "and" gates 54, 56, 58, 60 and 62. The inverted or "untrue" signal from the "0" taps of Schmitt trigger circuits 52a, 52b, 52c and 52d are fed respectively to "and" gates 56, 58, 60 and 62 respectively.

The conduits 95, 96, and 97 from the outputs of the three bi-stable multivibrators 18, 20 and 22 of ring counter 16 are labeled "green," "blue" and "red" respectively as each is in its "on" state when that particular color band is being scanned by the electron beam of cathode ray tube 44.

The circuit in FIG. 1 shows one of many possible arrangements of connecting the three "color" gating signals from ring counter 16 to the various "and" and "or" gates of gating and matrixing circuit 45. In the arrangement of FIG. 1, a voltage will appear at the output of gate 54 if, and only if, Schmitt trigger circuit 52a is "on" and bi-stable multivibrator 22 is "on." Since tap 50e is nearest ground potential, Schmitt trigger circuit 52a receives the smallest amplitude signal from the voltage divider formed by resistors 46a through 46d and 47. Thus a much larger signal is required from the input source 10 to trigger circuit 52a "on" than for any of the other Schmitt trigger circuits. Assuming each trigger circuit has the same trigger level, Schmitt trigger circuit 52a is the least sensitive, 52b the next least sensitive, and so on, with 52e being most sensitive. If Schmitt trigger circuit 52a is "on," then so must all other Schmitt trigger circuits 52b through 52e likewise be "on" since their trigger level would have been exceeded before the trigger level of 52a is reached. The inverted output from the "0" tap of Schmitt trigger circuit 52a inhibits "and" gate 56 since it is at ground or zero voltage. Gates 58, 60 and 62 are likewise inhibited by outputs of the "0" taps of Schmitt trigger circuits 52b, 52c, and 52d, respectively, since they likewise are at zero voltage. Thus, the grid of the electron gun in the cathode ray tube 44 is in the cut-off state except when the beam is sweeping across the red-emitting phosphor or band 84. The result is therefore a red color or light being focused on the reproducing film 94 indicated by line 93. The red color on the recording medium represents a selected feature of the input signal; e.g. the occurrence of a certain amplitude level.

In a similar manner, if Schmitt trigger circuits 52a through 52c are "off" but Schmitt trigger circuits 52d and 52e are "on," then gates 54, 56 and 68 will be inhibited by the "1" tap outputs of Schmitt trigger circuits 52a, 52b, and 52c being at ground or zero voltage. Gate 60 therefore is the only one which is not inhibited from passing a signal. All three color signals 95, 96, and 97 are present on "and" gate 60 through "or" gate 66, so an output voltage appears because Schmitt trigger circuit 52d is "on" and the "0" tap of Schmitt trigger circuit 52c is "on." (When Schmitt trigger circuit 52c is "off," the inverted signal is considered to be "on" and vice versa.) It will be remembered that only multivibrator 18 or 20 or 22 is "on" at any one given time, as illustrated in curves D, E, and F of FIG. 2. The result is that the grid of the electron gun in cathode ray tube 44 allows the electron beam to pass to the phosphor screen face during the time it is sweeping across each of the three color phosphors or bands 84, 86, and 88. In such an instance there will then be recorded three narrow strips, one of green, one of blue and one of red, on the color recording medium 94. However, since the sweep rate is high, the recording medium will not resolve the three separate colors but will mix them to give white. This "white" color is assigned to represent another feature of the input signal, e.g. another amplitude level. Other combinations give other colors. Since virtually any color can be obtained by the proper mixture of red, blue and green light, this system is capable of representing features of the input signal in any desired set of colors. The colors are varied depending upon the gating used and the amount of "color" signals on conduits 95, 96, and 97 allowed to pass through the gates.

Resistors 64, 66, 68, 70 and 72 are used to balance the output for different colors. This is used since light is present on recording medium 94 for only one-third of the time when producing one of the primary colors, two-thirds of the time for equal addition of two primaries, and all the time for three-color (or white) mixture.

If it is desired to achieve different hues than the primaries or complements and white, then various additional resistances can be added between the connecting conduits 95, 96 and 97 and the "or" gates 64 and 66. Further, as many gates and associated trigger circuits can be used as desired so that any number of desired color separations can be obtained.

It will be noted that the foregoing description has been concerned primarily with merely one preferred structure of the embodiment of the invention. It will be apparent that numerous modifications and variations may be incorporated in the system without departing from the spirit or scope of the invention. In particular, it is evident that the use of "negative logic" has been used herein only for purposes of illustrating one embodiment of the invention. "Positive logic" can also be used equally well.

What is claimed is:

1. A system for presenting a signal having amplitude variations and in which system a cathode ray tube is used, the improvement which comprises: three distinct bands of material on the face of said cathode ray tube, each band emitting a separate primary color when energized by the electron beam from the electron gun of said cathode ray tube; means to sweep traversely the beam successively across each band; a recording medium; means to control the energizing of the electron gun during each sweep according to the amplitude of the signal being processed; means to move said recording medium normal with respect to the sweep across the face of said cathode ray tube; and optical means of a character to display the beam of light received from the cathode ray tube as a single line upon said recording medium.

2. A system for presenting a signal having amplitude variations which comprises in combination: a cathode ray tube having horizontal deflection plates and vertical deflection plates, the face of said cathode ray tube being coated with three bands of material, the first band emitting a red light, the second a blue light, and the third a green light when energized by an electron beam; a sawtooth generator; means connecting the output of said sawtooth generator to the horizontal deflection plates of said cathode ray tube; control means to activate said vertical deflection plates so as to move the electron beam from one band on the face of the cathode ray tube to the next at each peak of the sawtooth waveform of the output of said sawtooth generator; energizing means to energize fully said electron beam during each sweep for its entire duration upon the occurrence of selected amplitude levels of said signal assigned for that sweep; a recording medium; means to move said recording medium normal with respect to the sweep across the face of said cathode ray tube; and optical means of a character for focusing the beam of light received from the cathode ray tube as a single line upon said recording medium.

3. A system for presenting a signal having amplitude variations which comprises: a cathode ray tube having horizontal deflection plates and vertical deflection plates, the face of said cathode ray tube having three distinct bands of material, each band emitting a separate primary color when energized by the electron beam in said cathode ray tube; a sawtooth generator; means connecting the horizontal deflection plates of said cathode ray tube with said sawtooth generator; means connected to said vertical plates to move the electron beam successively from one band to the other at each peak of the output signal from said sawtooth generator; means to energize said electron gun during each sweep upon the occurrence of a selected feature of the signal during that sweep; a recording medium; means to move said recording medium normal with respect to the horizontal axis of the face of said cathode ray tube; and optical means of a character to display the beam of light received from the cathode ray tube as a single line upon said recording medium.

4. A system for presenting a signal having amplitude variations which comprises: a cathode ray tube having an electron gun and also having horizontal deflection plates and vertical deflection plates, the face of said cathode ray tube having three distinct bands of material, one band emitting a red color, a second band emitting a blue color, and a third band emitting a green color upon energization by an electron beam from said electron gun in said cathode ray tube; a sawtooth generator; means connecting the horizontal deflection plates of said cathode ray tube with said sawtooth generator; control means to move the electron beam sequentially from one band to the other at each retrace of the waveform from the sawtooth generator; a gating and matrixing circuit electrically connected to receive the signal being processed and whose output is electrically connected to the gun of said cathode ray tube and of a character to control the energization of the electron gun with said cathode ray tube for each sweep of the electron beam as a function of assigned amplitude intervals of the signal; a photo-sensitive recording medium; means to move said recording medium with respect to the face of said cathode ray tube; and means of a character to display the beam of light received from the cathode ray tube as a single relatively straight line upon said recording medium for each horizontal sweep during which the electron gun is energized.

5. A system for presenting a seismic signal having amplitude variation and in which system a cathode ray tube is used, the improvement which comprises:
  three distinct bands of material on the face of said cathode ray tube, each band emitting a separate color when energized by an electron beam from the electron gun of said cathode ray tube;
  a sawtooth generator;
  means to sweep traversely the beam across the face of said tube in accordance with the output of said sawtooth generator;
  a voltage divider having an input and a plurality of contact points thereon;
  means to connect the seismic signal to the input of said voltage divider;
  control means including a ring counter electrically connected to the output of said sawtooth generator and whose output is a series of repeating sequential stepped waveforms having three levels of equal duration, each such level being for a period coincident with the sweep of said sawtooth generator, the output of said ring counter being connected to the vertical deflection plates of said cathode ray tube;
  means fully energizing the electron gun of said cathode ray tube for the complete duration of a sweep upon the simultaneous occurrence of a voltage level from said ring counter and a voltage appearing at a contact on said voltage divider assigned to such voltage level.

6. An apparatus as defined in claim 5 including a recording medium; means to move said recording medium normal with respect to the sweep across the face of said cathode ray tube; and optical means to display the beam of light received from the cathode ray tube as a single relatively straight line upon said recording medium.

7. A system for presenting a signal having an amplitude variation which comprises:
  a cathode ray tube having horizontal deflection plates and vertical deflection plates, the face of said cathode ray tube being coated with three bands of material, the first band emitting a first color light, the second band a second color light, and the third band a third color light when energized by an electron beam;
  a sawtooth generator;
  means connecting the output of said sawtooth generator to the horizontal deflection plates of said cathode ray tube;
  energizing means to energize said electron beam during each sweep for its entire duration on the occurrence of selected amplitude levels of said signal assigned for that sweep; and
  control means to activate said vertical deflection plates so as to move the electron beam from one band on the face of the cathode ray tube to the next at each peak of the sawtooth waveform of the output of said sawtooth generator, said control means including a ring counter having three flip-flops and being electrically connected to the output of said sawtooth generator and whose output is a series of reepating sequentially stepped waveforms having three levels of equal duration, each such level being for a period coincident with the sweep of said sawtooth generator, the "1" output of each said flip-flop enabling the energizing means upon the simultaneous occurrence of such "1" output and the occurrence of its associated selected amplitude level of said signal.

References Cited by the Examiner
UNITED STATES PATENTS 2,337,980  12/43  Du Mont et al. _____ 178—5.4
3,025,125  3/62   Walker _____ 346—110

OTHER REFERENCES

Murphy: Fundamentals of the Digital Computer, vol. 1, pp. 1–20 1958, Aug. 12, 1958.

LEYLAND M. MARTIN, *Primary Examiner.*
LEO SMILOW, *Examiner.*